United States Patent
Segu

(10) Patent No.: US 9,973,384 B2
(45) Date of Patent: May 15, 2018

(54) SYSTEM AND METHOD FOR ENTERPRISE JAVA BEAN SUPPORT IN A MULTITENANT APPLICATION SERVER ENVIRONMENT

(71) Applicant: ORACLE INTERNATIONAL CORPORATION, Redwood City, CA (US)

(72) Inventor: Srinivasa Segu, Fremont, CA (US)

(*) Notice: Subject to any disclaimer, the term of this patent is extended or adjusted under 35 U.S.C. 154(b) by 352 days.

(21) Appl. No.: 14/868,050

(22) Filed: Sep. 28, 2015

(65) Prior Publication Data
US 2016/0094408 A1    Mar. 31, 2016

Related U.S. Application Data

(60) Provisional application No. 62/055,877, filed on Sep. 26, 2014.

(51) Int. Cl.
*G06F 15/173* (2006.01)
*H04L 12/24* (2006.01)
*H04L 29/08* (2006.01)

(52) U.S. Cl.
CPC ...... *H04L 41/0843* (2013.01); *H04L 41/0893* (2013.01); *H04L 41/12* (2013.01); *H04L 67/1004* (2013.01); *H04L 67/327* (2013.01)

(58) Field of Classification Search
CPC .......... H04L 41/20; H04L 67/10; H04L 67/42
USPC ................................ 709/223, 200
See application file for complete search history.

(56) References Cited

U.S. PATENT DOCUMENTS

| 2003/0050932 | A1* | 3/2003 | Pace .................. G06F 8/60 |
| 2004/0015578 | A1* | 1/2004 | Karakashian .......... H04L 67/02 709/223 |
| 2005/0160434 | A1* | 7/2005 | Tan .................. G06F 9/465 719/331 |
| 2011/0213870 | A1 | 9/2011 | Cal |
| 2012/0072597 | A1 | 3/2012 | Teather |
| 2012/0110566 | A1 | 5/2012 | Park |

OTHER PUBLICATIONS

European Patent Office, International Searching Authority, International Search Report and Written Opinion dated April 24, 2015 for International Application No. PCT/US2015/012268 , 10 Pages.

* cited by examiner

*Primary Examiner* — El Hadji Sall
(74) *Attorney, Agent, or Firm* — Tucker Ellis LLP

(57) ABSTRACT

In accordance with an embodiment, described herein is a system and method for supporting Enterprise Java Bean (EJB) and other application types in a multitenant application server environment. The system includes an application server domain with a plurality of partitions, an EJB application, and a plurality of partition-aware server components that interact with the EJB container. The EJB application includes partition-specific code deployed as a separate instance to each partition, and shareable resources across two or more partitions. The system can additionally delegate resource-heavy processing functions of each EJB application to one or more of the server components. At runtime, the system receives a request for an EJB application in a particular partition, and creates an object to hold information of the particular partition. The server components, when invoked by the EJB container, obtains the partition information and execute in a context of the particular partition.

20 Claims, 8 Drawing Sheets

SYSTEM AND METHOD FOR ENTERPRISE JAVA BEAN SUPPORT IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Application titled "SYSTEM AND METHOD FOR ENTERPRISE JAVA BEAN SUPPORT IN A MULTITENANT APPLICATION SERVER ENVIRONMENT", Application No. 62/055,877, filed Sep. 26, 2014; and is related to U.S. Provisional Application titled "SYSTEM AND METHOD FOR SUPPORTING MULTITENANCY IN AN APPLICATION SERVER, CLOUD, OR OTHER ENVIRONMENT", Application No. 61/929,888, filed Jan. 21, 2014; and U.S. patent application titled "SYSTEM AND METHOD FOR SUPPORTING MULTI-TENANCY IN A APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for supporting enterprise Java bean and other application types in a multitenant application server environment.

BACKGROUND

Software application servers, examples of which include Oracle WebLogic Server (WLS) and Glassfish, generally provide a managed environment for running enterprise software applications. Recently, technologies have also been developed for use in cloud environments, which allow users or tenants to develop and run their applications within the cloud environment, and to take advantage of distributed resources provided by the environment. As such, server components in a traditional application server environment may have to be modified for such a cloud environment.

SUMMARY

In accordance with an embodiment, described herein is a system and method for supporting Enterprise Java Bean (EJB) and other application types in a multitenant application server environment. The system includes an application server domain with a plurality of partitions, an EJB container, and a plurality of partition-aware server components that interact with the EJB container. The system further includes an EJB application with partition-specific code and shareable code across multiple partitions, wherein the partition-specific code can be deployed as a separate instance to each partition. Resource-heavy processing of the EJB application can be delegated to the server components. At runtime, the system receives a request for an EJB application instance in a particular partition, and creates an object to hold information of the particular partition. The server components, when invoked by the EJB container, can obtain the partition information and execute in a context of the particular partition.

DETAILED DESCRIPTION

In accordance with an embodiment, described herein is a system and method for supporting Enterprise Java Bean (EJB) and other application types in a multitenant application server environment. The system includes an application server domain with a plurality of partitions, an EJB container, and a plurality of partition-aware server components that interact with the EJB container. The system further includes an EJB application with partition-specific code and shareable code across multiple partitions, wherein the partition-specific code can be deployed as a separate instance to each partition. Resource-heavy processing of the EJB application can be delegated to the server components. At runtime, the system receives a request for an EJB application instance in a particular partition, and creates an object to hold information of the particular partition. The server components, when invoked by the EJB container, can obtain the partition information and execute in a context of the particular partition.

Application Server (e.g., Multi-Tenant, MT) Environment

Figure 1:
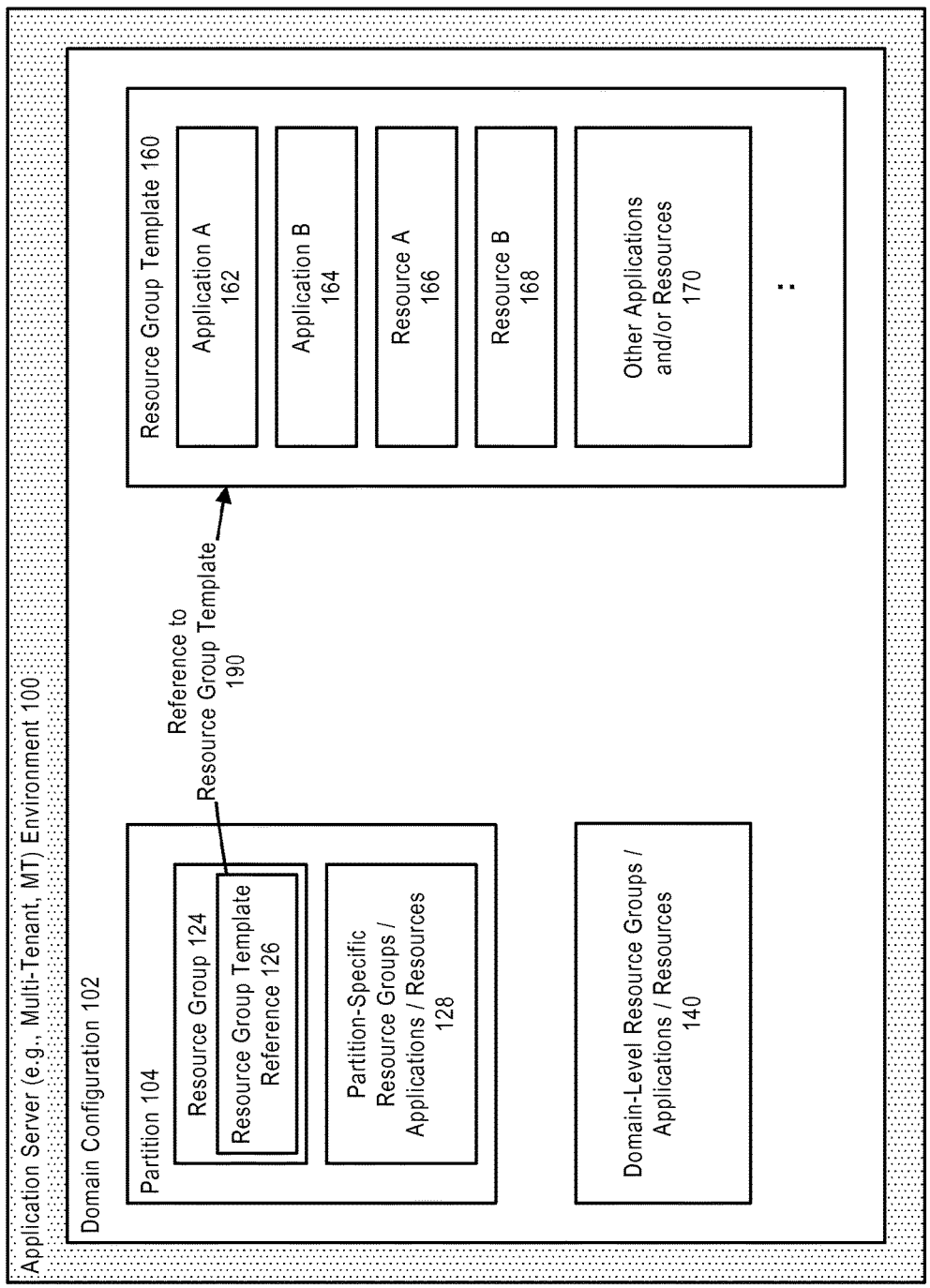
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
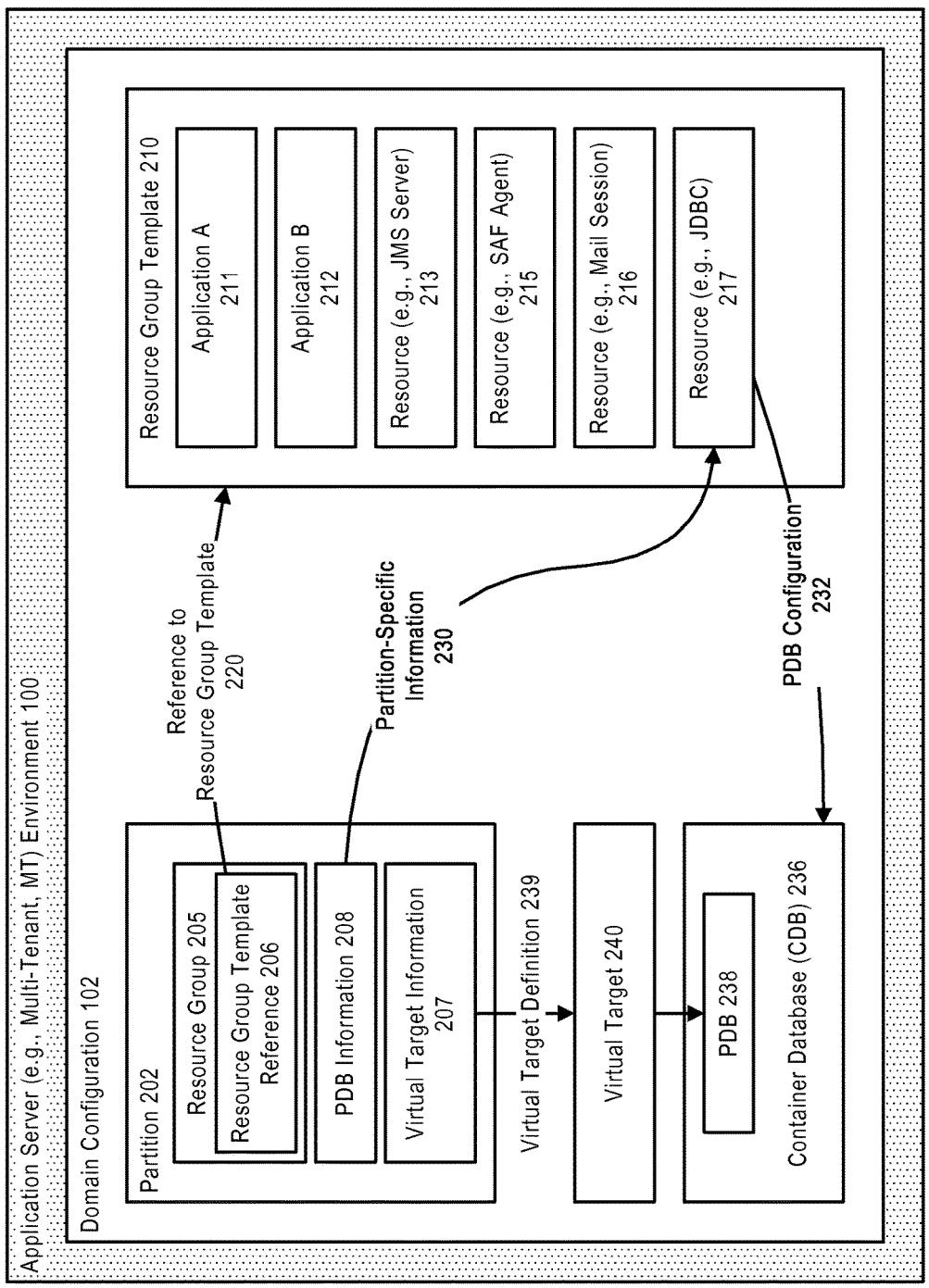
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
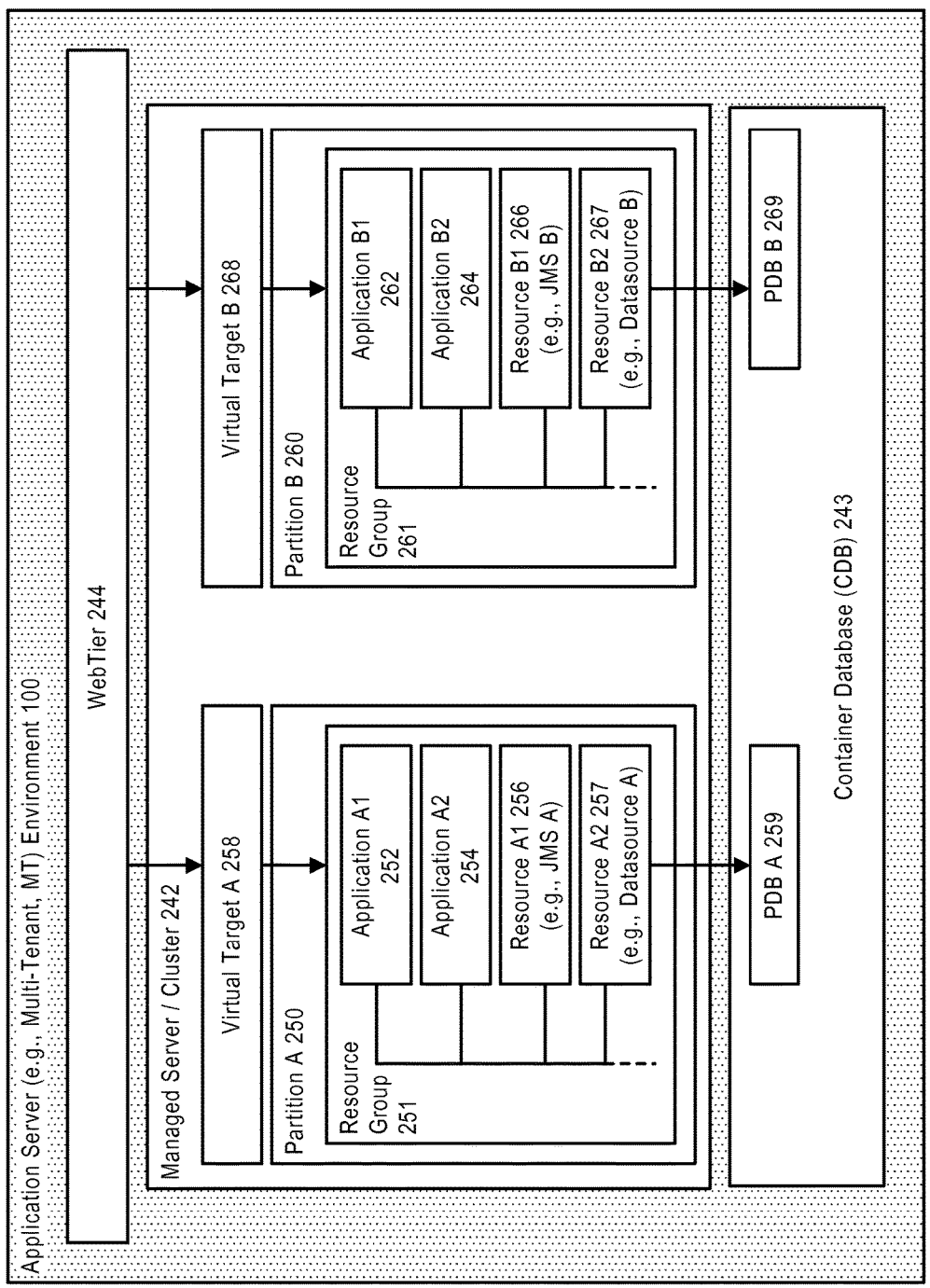
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition.

Figure 4:
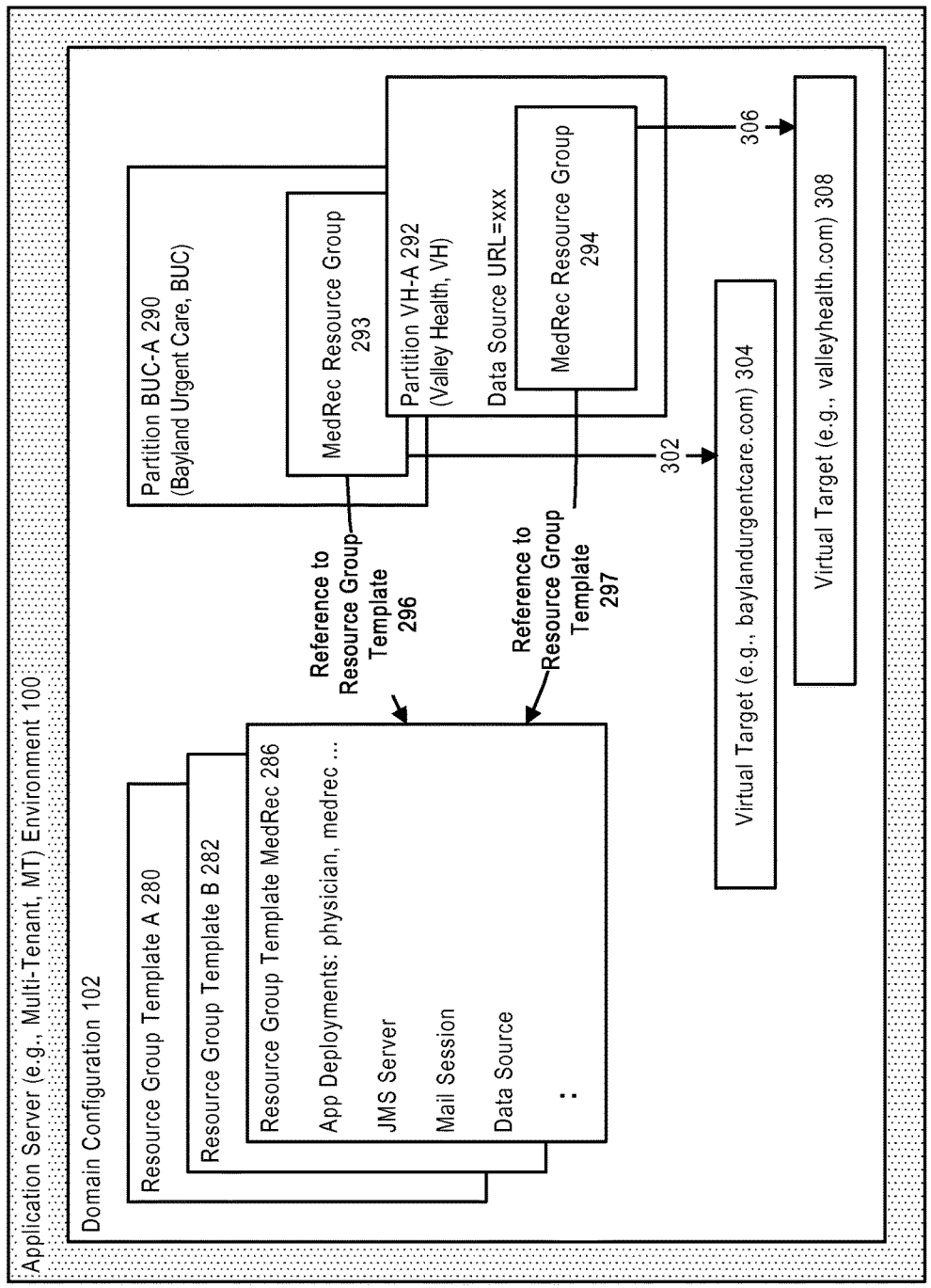
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
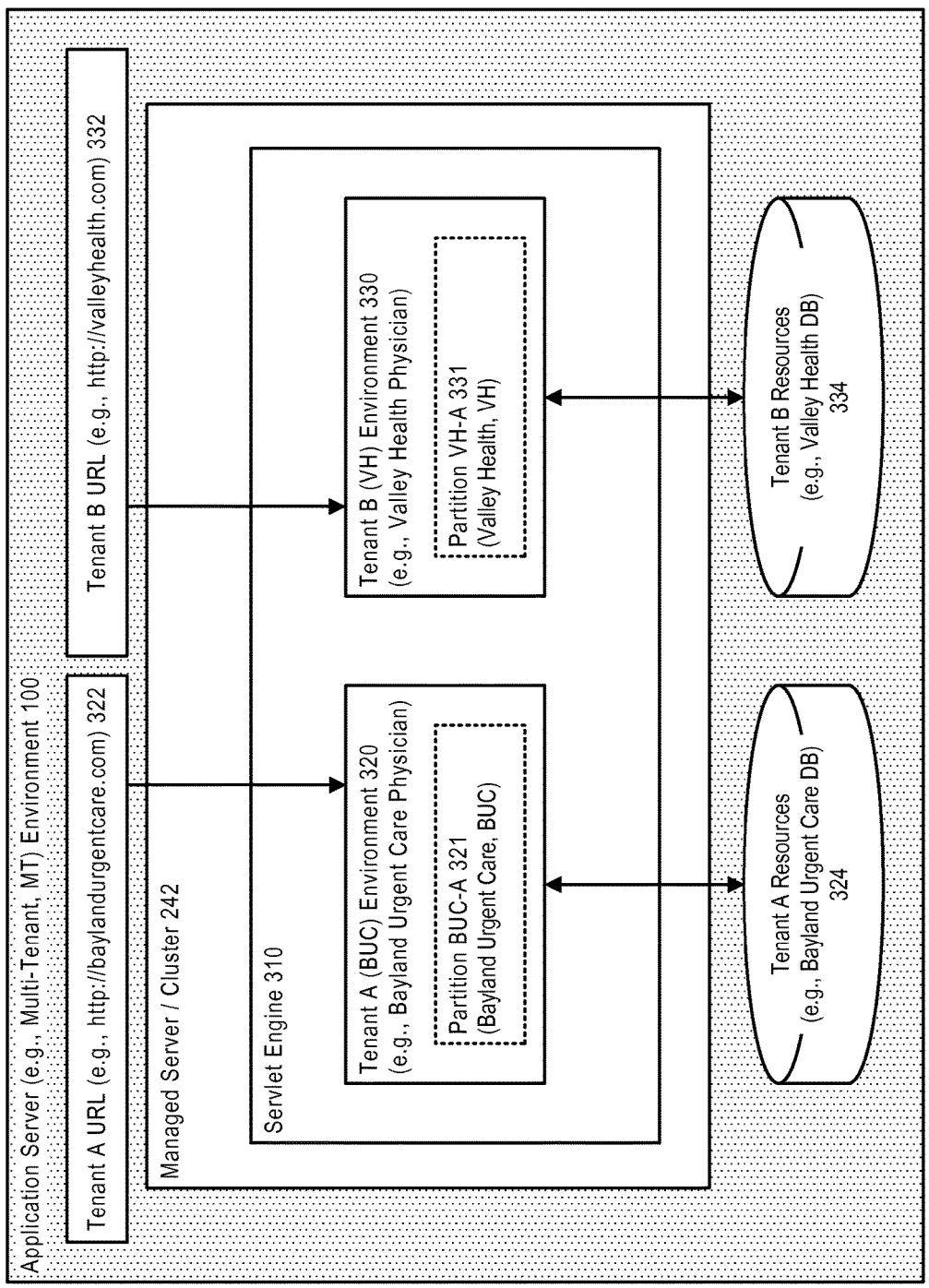
FIG. 5 further illustrates an exemplary multi-tenant environment, in accordance an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

EJB Support

In a multitenant application server environment, EJB container implementations can be partition-unaware. As such, a same EJB application deployed to various partitions in an application domain can have a separate instance of the application for each partition in the EJB container. For example, each partition have a separate copy of RMI remote objects, object pools, caches, module class loader spaces, MBean trees, descriptor bean trees, and message pollers.

Under such an approach, resource requirements on a server JVM process can linearly increase as the number of tenants using an application grows.

In accordance with an embodiment, described herein is a system and method for supporting Enterprise Java Bean (EJB) and other application types in a multitenant application server environment. The system includes an application server domain with a plurality of partitions, an EJB container, and a plurality of partition-aware server components that interact with the EJB container. The system further includes an EJB application with partition-specific code and shareable code across multiple partitions, wherein the partition-specific code can be deployed as a separate instance to each partition. Resource-heavy processing of the EJB application can be delegated to the server components. At runtime, the system receives a request for an EJB application instance in a particular partition, and creates an object to hold information of the particular partition. The server components, when invoked by the EJB container, can obtain the partition information and execute in a context of the particular partition.

In accordance with an embodiment, each EJB application can be associated with a resource name qualified by a partition name in a Java Naming and Directory Interface (JNDI) namespace. The JNDI namespace allows an EJB application or another resource to be deployed multiple times in a plurality of partitions without requiring an application developer or system administrator to make any changes to the application. For example, the deployment descriptor needs not to be changed, and a deployment plan needs not to be added.

This feature is particularly useful when an application developer needs to determine which part of an EJB application can be shared across partitions.

In accordance with an embodiment, by delegating resource-heavy processing of an EJB application to partition-aware server components, deployment density of the EJB application can be improved in a multitenant application server environment.

Figure 6:
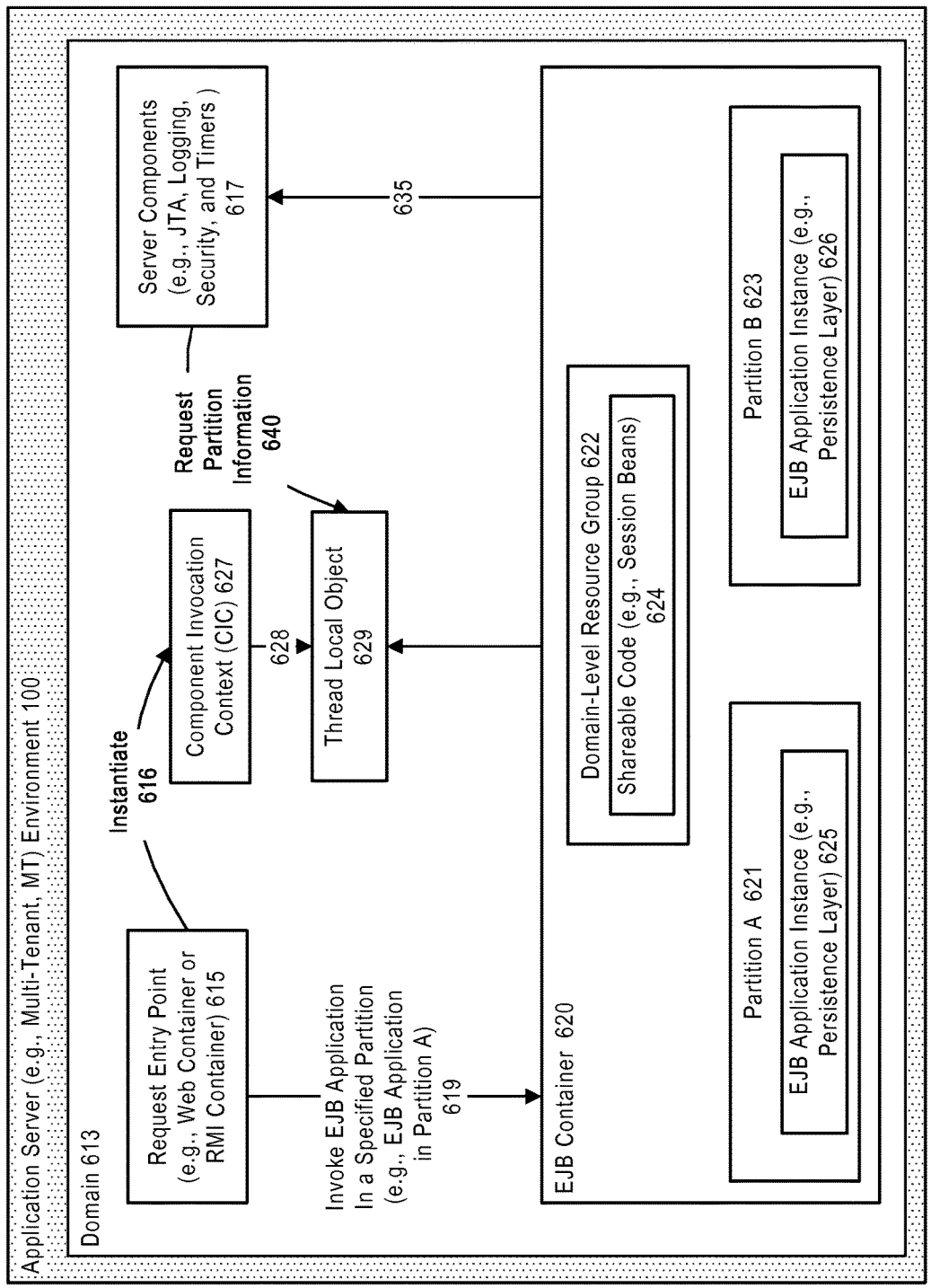
FIG. 6 illustrates a system for supporting Enterprise Java Bean (EJB) and other application types in a multitenant application server environment, in accordance with an embodiment.

FIG. 6 illustrates a system for supporting Enterprise Java Bean (EJB) and other application types in a multitenant application server environment, in accordance with an embodiment.

As shown in FIG. 6, a domain 613 in the application server environment can include an EJB container 620 with a plurality of copies of a same EJB application, each copy deployed to a partition. For example, EJB application instance 625 is deployed to partition A 621, and EJB application instance 626 is deployed to partition B 623. Each EJB application instance can include metadata customized for its associated partition, and the resource name of each application instance can be qualified by the associated partition name in a JNDI namespace.

As further shown in FIG. 6, the EJB container can include code 624 deployed to a domain-level resource group 622, wherein the code can be shared across a plurality of partitions, for example partition A and partition B.

In accordance with an embodiment, the shareable code can be code determined to multiply over partitions, examples of which can include session EJBs. The EJB application deployed to a partition can be code determined not to be multiplied, examples of which can include a persistence layer associated with the EJB application.

Server Components

In accordance with an embodiment, a plurality of server's infrastructure components (server components) 617 can be used to handle resource-heavy processing functions. The server components can include a logging component, a job scheduler, an application container, a timer component, and a Java Transaction API (JTA). Each server component can be partition-aware.

For example, even if there is a single logging component in the domain, the logging component can determine under which partition context it is operating.

In accordance with an embodiment, the multi-tenancy implementation of the EJB container depends 635 on these server components. As such, a partition identity needs to be established before invoking these partition aware/sensitive server components.

In accordance with an embodiment, the partition identity can be established at a first point where the partition identity can be ascertained in processing a request, so that downstream server components can use the partition identity for supporting appropriate scoping. The first point that establishes a partition identity can be different depending on the type of request entering the domain. For example, for a RMI request, the first point can be the RMI component; for a HTTP request, the first point can be the web container; and for a timer request, the first point can be a work manager or a job scheduler.

In accordance with an embodiment, when there is a partition switching within a dispatched work, a server component that performs the switching can establish the partition identity.

As shown in FIG. 6, a request entry point 615 (for example, an RMI container or an HTTP container) can be a first point used to establish a partition identity. The request entry point can receive a client request for invoking 619 an EJB application in a specified partition, and instantiate 616 a component invocation context (CIC) 627 to hold information for the partition, the application, modules and components of the application. The request entry point can push 628 the CIC to a thread associated with a thread local object 629 as ThreadLocal state.

In accordance with an embodiment, a thread local object can provide thread-local variables, wherein each thread that accesses such a variable can have a separate copy of the variable. The request entry point that has established the partition identity can ensure that a correct CIC context is pushed to or popped from a thread.

For example, the thread can be a worker thread for processing an HTTP request or for asynchronous processing; or a timer thread for invalidating expired HTTP session, or for invoking timeout methods on Listener interfaces.

In accordance with an embodiment, a CIC context can be propagated directly through a CIC context manager, or indirectly through a work manager. Downstream components on the invocation chain (for example JNDI, JDBC, EJB container, security, and logging) can request 640 the partition information from the CIC popped from a corresponding thread associated with the thread local object. If a server component uses object-based stickiness (instead of the thread context based approach) of the partition identity, the calling component (for example, the EJB container) may need to retrieve the CIC context and use an appropriate API to pass the information to the server component.

In accordance with an embodiment, the downstream server components use the received partition identity to support appropriate scoping, and execute in a context of the identified partition.

For example, a security component can support multiple active security realms in an application server domain, to secure applications in the multi-tenant application server environment. Different partitions can be configured to use different active realms. The partition identity can be used to identify the active security realm configured for the partition.

As another example, a JTA server component can enable partition level customization/override of the JTA metadata through a configuration MBean (for example, JTAPartition-MBean). Application containers (for example, the EJB container) can honor the overrides when handling applications deployed inside an identified partition. An example attribute for the EJB container to honor can be the transaction timeout second. In addition, runtime JTA statistics for an application deployed to the identified partition can be reported in a corresponding runtime Mbean (for example, JTAPartition-RuntimeMBean) sub-tree.

In accordance with an embodiment, an EJB timer component under the cover utilizes a job scheduler, which is implemented as a cluster level singleton service in a server. The job scheduler can honor partition level overrides of a data source configured for the job scheduler, and persist timer data to the data source configured at the partition level. To provide data isolation for different partitions, partition-level default stores can be added.

In an accordance with an embodiment, a partition-aware logging component can include the partition identity when log messages are written to log files.

Figure 7:
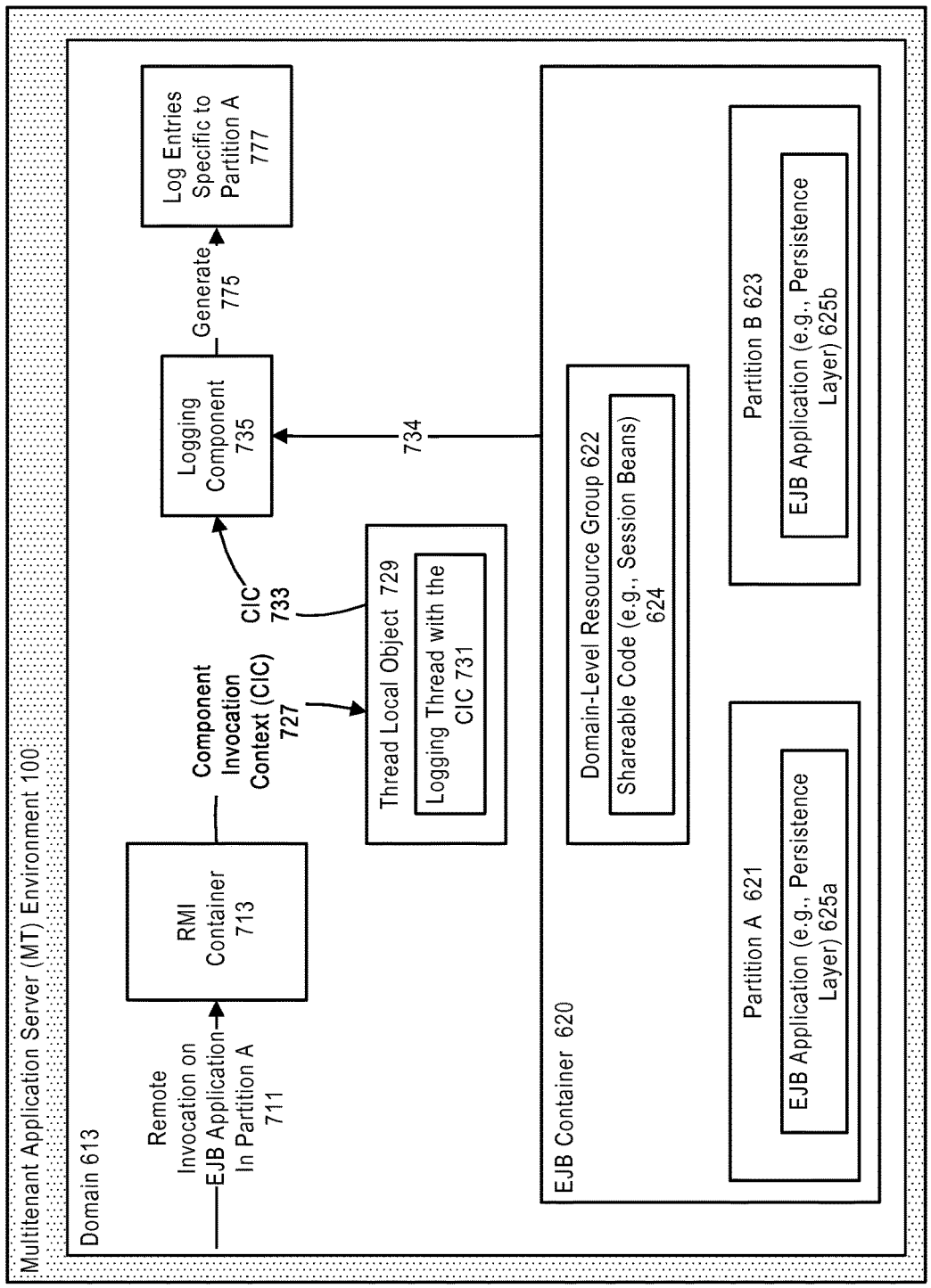
FIG. 7 illustrates a system for supporting Enterprise Java Bean (EJB) and other application types in a multitenant application server environment, in accordance with an embodiment.

FIG. 7 illustrates a system for supporting Enterprise Java Bean (EJB) and other application types in a multitenant application server environment, in accordance with an embodiment.

As shown in FIG. 7, an RMI container 713 can receive an RMI request 711 for an EJB application in Partition A, and establish an identity of the partition by parsing the RMI request and analyzing associated object graphs. A CIC context object 727 containing the partition identity can be instantiated and pushed on a thread 731 associated with a logging component 735 in a thread local object 729.

In accordance with an embodiment, when the EJB container invokes the logging component for writing log messages 734 after processing the RMI request, the logging component can retrieve 733 the partition identity information (for example, the partition ID) from the CIC context, and generate 775 log messages, each of which can include the partition ID. As described above, the RMI container can operate to pop the CIC context from the logging thread.

Figure 8:
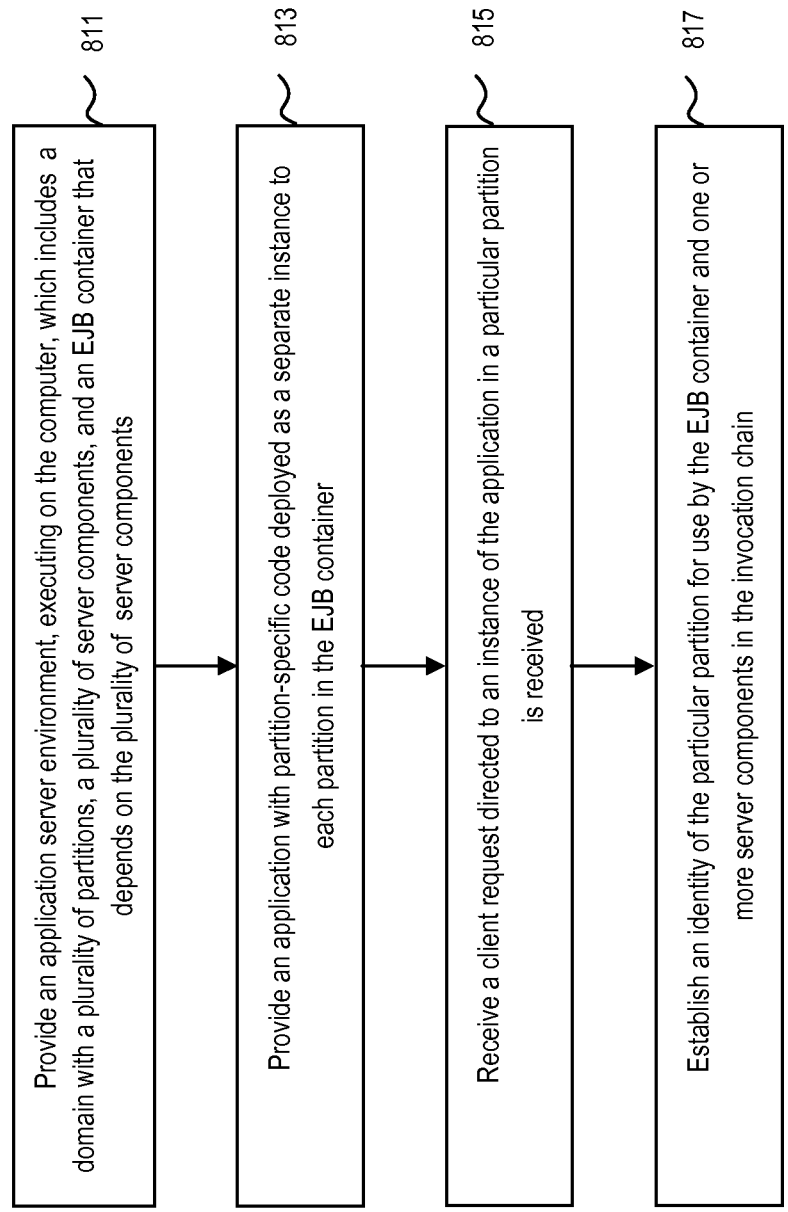
FIG. 8 illustrates a method for supporting Enterprise Java Bean (EJB) and other application types in a multitenant application server environment, in accordance with an embodiment.

FIG. 8 illustrates a method for supporting Enterprise Java Bean (EJB) and other application types in a multitenant application server environment, in accordance with an embodiment.

As shown in FIG. 8, at step 811, an application server environment, executing on a computer can be provided, wherein the application server environment includes a domain with a plurality of partitions, a plurality of server components, and an EJB container that depends on the plurality of server components.

At step 813, an application with partition-specific code can be deployed as a separate instance to each partition in the EJB container.

At step 815, a client request directed to an instance of the application in a particular partition is received.

At step 817, the system establishes an identity of the particular partition for use by the EJB container and one or more server components.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for providing Enterprise Java Bean (EJB) application support in an application server environment, comprising:
    a computer that includes a microprocessor;
    an application server environment, executing on the computer, which includes a domain with a plurality of partitions, a plurality of server components, and an EJB container that depends on the plurality of server components;
    an application with partition-specific code deployed as a separate instance to each partition in the EJB container;
    wherein when a client request directed to an instance of the application in a particular partition is received, the system establishes an identity of the particular partition; and
    wherein the identity of the particular partition is stored in a component invocation context (CIC) and passed through the plurality of server components in the CIC, and enables each of the plurality of server components to execute in a context of the particular partition.

2. The system of claim 1, wherein the partition-specific code is part of the EJB application that has been determined not to be multiplied.

3. The system of claim 1, wherein the plurality of server components include a logging component, a job scheduler, an application container, a timer component, and a Java Transaction API (JTA).

4. The system of claim 1, wherein each of the plurality of server components is partition-aware.

5. The system of claim 1, the partition identity is established at an entry point into the domain wherein the partition identity can be ascertained.

6. The system of claim 5, wherein the entry point is one selected from a group consisting of a remote method invocation container, a work manager, a job scheduler, and a web container.

7. The system of claim 1, wherein the CIC is instantiated at an entry point, and pushed on a thread for use by the EJB container or one of the server components.

8. The system of claim 7, wherein the entry point that instantiates the CIC context pushes the CIC context on and pop it from the thread.

9. The system of claim 7, wherein the CIC context is pushed on the threads as ThreadLocal state.

10. A method for providing Enterprise Java Bean (EJB) application support in a multitenant application server environment, comprising:
    providing an application server environment, executing on a computer, which includes a domain with a plurality of partitions, a plurality of server components, and an EJB container that depends on the plurality of server components;
    providing an application with partition-specific code deployed as a separate instance to each partition in the EJB container;
    receiving a client request directed to an instance of the application in a particular partition is received;
    establishing an identity of the particular partition;

storing the identity of the particular partition in a component invocation context (CIC); and wherein the identity of the particular partition is passed through the plurality of server components in the CIC, and enables each of the plurality of server components to execute in a context of the particular partition.

11. The method of claim 10, wherein the partition-specific code is part of the EJB application that has been determined not to be multiplied.

12. The method of claim 10, wherein the plurality of server components include a logging component, a job scheduler, an application container, a timer component, and a Java Transaction API (JTA).

13. The method of claim 10, wherein each of the plurality of server components is partition-aware.

14. The method of claim 10, the partition identity is established at an entry point into the domain wherein the partition identity can be ascertained.

15. The method of claim 14, wherein the entry point is one selected from a group consisting of a remote method invocation container, a work manager, a job scheduler, and a web container.

16. The method of claim 10, wherein the CIC is instantiated at an entry point, and pushed on a thread for use by the EJB container or one of the server components.

17. The method claim 16, wherein the entry point that instantiates the CIC context pushes the CIC context on and pop it from the thread.

18. The method of claim 16, wherein the CIC context is pushed on the threads as ThreadLocal state.

19. A non-transitory computer readable storage medium, including instructions stored thereon which when read and executed by one or more computers cause the one or more computers to perform the steps comprising:
  providing an application server environment, executing on a computer, which includes a domain with a plurality of partitions, a plurality of server components, and an EJB container that depends on the plurality of server components;
  providing an application with partition-specific code deployed as a separate instance to each partition in the EJB container;
  receiving a client request directed to an instance of the application in a particular partition is received;
  establishing an identity of the particular partition;
  storing the identity of the particular partition in a component invocation context (CIC); and
  wherein the identity of the particular partition is passed through the plurality of server components in the CIC, and enables each of the plurality of server components to execute in a context of the particular partition.

20. The non-transitory computer readable storage medium of claim 19, wherein the partition-specific code is part of the EJB application that has been determined not to be multiplied.

* * * * *

UNITED STATES PATENT AND TRADEMARK OFFICE
CERTIFICATE OF CORRECTION

| | | |
|---|---|---|
| PATENT NO. | : 9,973,384 B2 | Page 1 of 1 |
| APPLICATION NO. | : 14/868050 | |
| DATED | : May 15, 2018 | |
| INVENTOR(S) | : Segu | |

It is certified that error appears in the above-identified patent and that said Letters Patent is hereby corrected as shown below:

In the Claims

In Column 13, Line 26, in Claim 17, after "method" insert -- of --.

Signed and Sealed this
Thirtieth Day of October, 2018

Andrei Iancu
*Director of the United States Patent and Trademark Office*